United States Patent [19]
Shroy et al.

[11] 3,926,222
[45] Dec. 16, 1975

[54] CORRUGATED TUBING WITH INTEGRAL COUPLING MEANS THEREON

[75] Inventors: Robert E. Shroy; John Schmunk, both of Findlay, Ohio

[73] Assignee: Hancock Brick and Tile Company, Findlay, Ohio

[22] Filed: Dec. 18, 1973

[21] Appl. No.: 425,878

[52] U.S. Cl. .................. 138/122; 61/10; 61/11; 138/155; 285/175
[51] Int. Cl. ..... F16l 21/00; F16l 37/00; F16l 41/00
[58] Field of Search ...... 285/DIG. 4, 175, 176, 235, 285/260, 423; 61/11, 10; 138/100–103, 118, 138/120–122, 155, 173

[56] References Cited
UNITED STATES PATENTS

| | | | |
|---|---|---|---|
| 3,374,634 | 3/1968 | Fochler | 61/10 |
| 3,695,643 | 10/1972 | Schmunk | 285/423 X |
| 3,785,682 | 1/1974 | Schaller et al. | 285/423 X |
| 3,825,288 | 7/1974 | Maroschak | 285/423 X |

*Primary Examiner*—Henry K. Artis
*Assistant Examiner*—James E. Bryant, III
*Attorney, Agent, or Firm*—Fay & Sharpe

[57] ABSTRACT

A perforated corrugated thermoplastic tubing having at least one uncorrugated cylindrical portion thereon suitable as a male member of a connection. Each uncorrugated cylindrical portion has cleats extending outwardly from the periphery thereof which operate as interlocking means for connecting such corrugated tubes together. The portions of the corrugated tubing immediately adjacent the uncorrugated portions have corrugations of a reduced depth to thereby receive the cleats of the uncorrugated cylindrical portion to provide a liquid pervious connection. The corrugated tubing may be severed at the junction of each cylindrical portion with the adjacent corrugated portion to thereby provide male and female components of a connection.

8 Claims, 4 Drawing Figures

CORRUGATED TUBING WITH INTEGRAL COUPLING MEANS THEREON

BACKGROUND OF THE INVENTION

This invention relates to flexible corrugated tubing and more particularly to means for joining lengths of flexible corrugated tubing.

For the drainage of soil and for use in connection with leach fields of septic systems, etc., clay or concrete tile, tube or pipe has traditionally been employed. This practice requires the placing together of relatively short sections or pieces of tile to construct the desired drainage system. Such construction is time consuming and therefore relatively expensive because numerous properly positioned connections must be made.

More recently with the use of plastic as a construction material, sections of plastic pipe or tubing are provided in predetermined lengths or sections which are interconnected with separate couplings. Emphasis has been placed on making the couplings simple in construction to facilitate ease of assembly and cost savings. In addition, the length of the sections of tubing has been extended to facilitate the laying of long lines of tubing. The tubing is provided in rolls of 250 feet, for example, to allow the user to select the desired length if less than 250 feet, or in 8- or 10-foot lengths. It is desirable to make the sections of tubing of a length that permits its use in short lengths as well as long lengths to facilitate assembly of various sized runs. Adjacent sections of tubing, of whatever length, are joined together by separate fittings, such as couplings.

The present invention provides corrugated plastic tubing that may be laid from a continuous roll or may be severed along the length thereof at predetermined points to provide individual sections without the need of stocking couplings since the continuous length has spaced integrally molded connection means thereon. The integral connection means are essentially "blanks", which upon severing provide a male and female connection member. Such integral interconnecting means eliminates the need for separate couplings and the need of stocking different lengths. In many cases, however, the tubing is molded in continuous lengths but severed into 8- or 10-foot lengths with a male and female component of the coupling being on opposite ends of each length.

SUMMARY OF THE INVENTION

This invention relates to a thermoplastic perforated tubing having corrugations along the length thereof with integrally molded connection means thereon. Each connection means includes a reduced diameter generally smooth walled male member having radially outwardly directed cleats thereon, and a corrugated female member with outside corrugations of the same diameter as the remaining corrugations of the tubing but of a reduced depth to thereby provide an effectively enlarged inside diameter. Since the depth of the corrugation in the female member is reduced, the wall thickness thereof will be greater because in the molding process, smooth walled tubing is extruded at a constant rate into a continuous molding machine whose molds are traveling at a constant rate.

DETAILED DESCRIPTION

Figure 1:
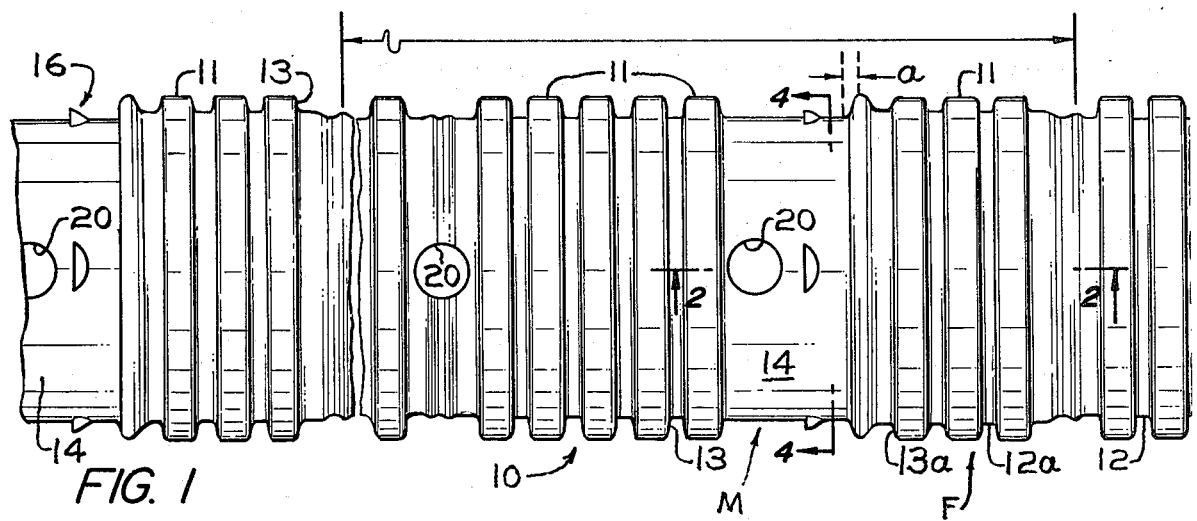
FIG. 1 is a side elevational view of a portion of a corrugated flexible tubing embodying the invention prior to severing the male and female components of the fitting.

Referring to the drawings wherein like reference numerals designate like or corresponding parts throughout the several views, there is shown in FIG. 1a flexible corrugated tube generally indicated at 10. The corrugations have peaks or crests 11 alternating with roots 12 and 12a connected by walls 13 and 13a. Such corrugations enhance materially the strength of the tubing and also permit flexibility. The tubing includes uncorrugated, generally cylindrical portions 14, which have an outside diameter no greater than the inside diameter of the corrugated portions at the root 12a.

For purposes of convenience and clarity the generally cylindrical portion is generally denoted M because it serves as the male member in the connection. Similarly, elements 12a and 13a are generally denoted F because they comprise the female portion of the connection.

Figure 2:
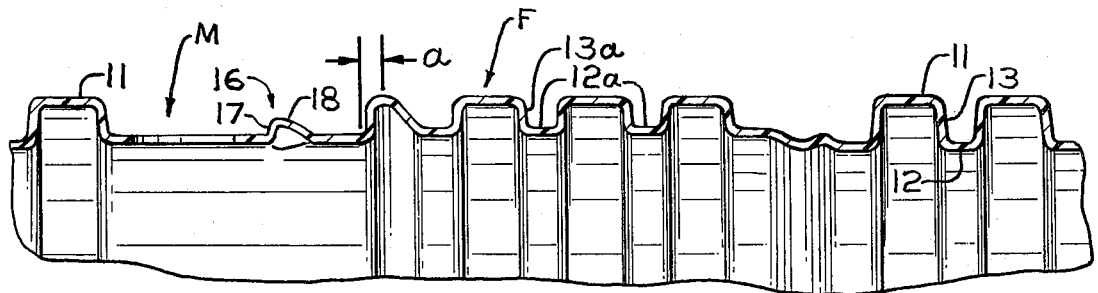
FIG. 2 is an enlarged cross sectional view of a portion of corrugated tubing shown in FIG. 1.
Figure 4:
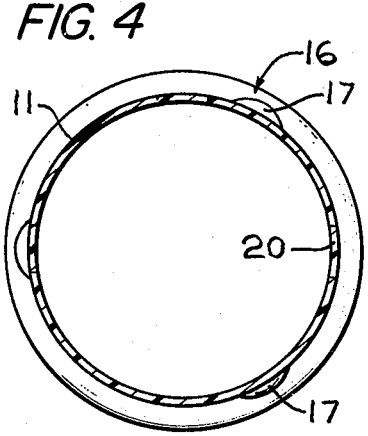
FIG. 4 is a front elevational view of the corrugated tubing taken on line 4—4 of FIG. 1.

The cylindrical portion serves as the male member of the connection and has a plurality of circumferentially spaced projections, cleats or abutments 16 that project outwardly therefrom. The cleats 16, providing an interlocking or interconnecting means, have a locking face 17 and an angularly disposed camming surface 18 as shown in FIG. 2. The radial dimension from the longitudinal center line of the corrugated tube to the extremity of the cleats 16 is greater than the radial dimension from the longitudinal center line of the corrugated tube to the inside of root 12a. Accordingly, the locking faces 17 will securely engage the inner wall surface 13a of the corrugation 12a to provide a secure interconnection. As illustrated in FIG. 4, three cleats are equally spaced in a plane 120° apart. Three or more cleats may be used.

The corrugated tubing 10 is typically formed as a smooth walled extrusion and subsequently continuously blow molded into the described configuration by traveling mold members to form a continuous length of tubing having alternating corrugated sections and cylindrical male coupling sections. It is important that the effective outside diameter of the tubing, as defined by the crests 11, be uniform along the length of the tubing, including connections so that the tubing will lay flat in the bottom of a trench. Accordingly, it is crucial to applicant's invention that the outside diameter of the crests 11 be essentially uniform throughout the length of the tubing. It is also important that the effective inside diameter of the tubing, including connections, be essentially uniform so that flow or through-put is not impeded.

Applicants solve these diverse problems, and additionally and importantly eliminate the need of a separate fitting, by reducing the depth of the root of corrugations 12a while leaving crests 11 associated with roots 12 and 12a equal to each other to thereby provide a female coupling integrally molded to the tubing.

The tubing is preferably molded into a continuous length with repetitious sections of corrugations 11 followed by the cylindrical male sections M and female sections F. As depicted by FIG. 1, the tubing may be severed at the juncture of the male section M and the female section E, as at a. It will be noted that no material is wasted, except for the material removed by the saw, in providing the male and female fittings. In the preferred embodiment the male component of the integral coupling is molded adjacent the female component and upon severing this orientation is retained so that end-to-end assembly of male to female components on opposite ends of adjoining sections is easily made. However, it is possible, within the scope of this invention, to alternately mold two male coupling components and two female coupling components between successive lengths of corrugated tubing, and then sever, the respective pairs of male or female components.

To connect one section to another section, the cylindrical portion 14 (M), being of a slightly smaller outside diameter than the inside diameter of roots 12a, is pressed therein until the camming surfaces 18 of the cleats 16 engage root 12a and cause a relative radial movement. As the camming surfaces 18 engage the first root 12a, the cleats deflect slightly, member M contracts slightly, and member F expands slightly until the locking face is released behind the first wall 13a. Similar actions and reactions occur as the cleats pass the second shallow root section 12a.

Figure 3:
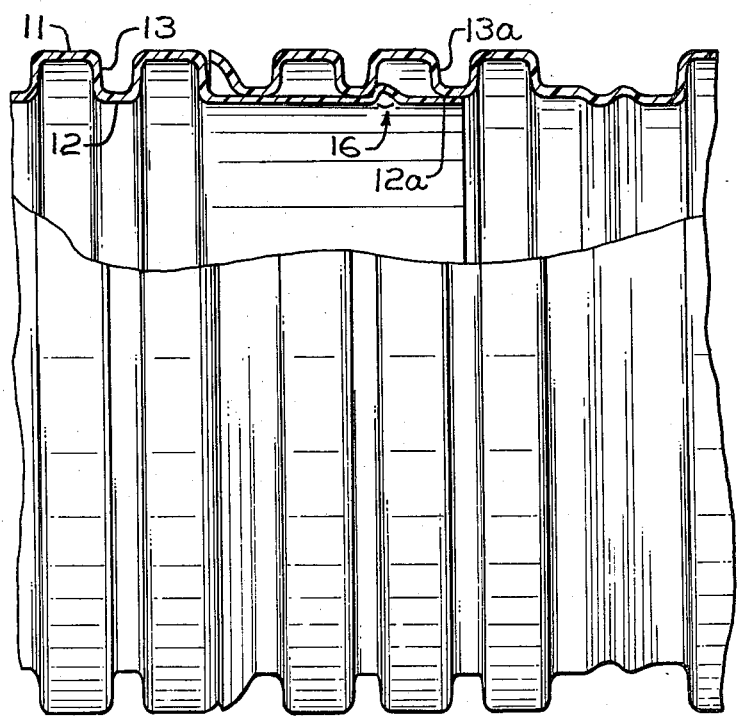
FIG. 3 is an enlarged side elevational view, partially in cross section showing the completed connection.

Referring now more particularly to FIG. 3, which illustrates the connection of this invention, it will be noted that the effective outside diameter is uniform across the connection, the effective inside diameter is not reduced across the connection because roots 12a define a larger inside diameter than roots 12 to thereby accommodate male member 14, and no fitting is necessary because the male member 14 is provided with cleats 16. It will also be noted that the inside diameter of the male member 14 is not less than the inside diameter of the tubing, as defined by the inside surface of roots 12, so that flow rates will not be impeded. Preferably, the various dimensions are selected so that one length of tubing is rotatable with respect to an adjacent length.

Again referring to the connection of FIG. 3, it will be noted that the locking face of the cleat is locked against the wall of the second corrugation. Accordingly, it is preferred that the distance between the locking face 17 and the first corrugation wall 13 be at least a distance equal to two corrugation pitches. The noted distance should be a multiple of the corrugation pitch, or at least two. In this regard it will also be noted that the corrugation pitches of the shallow corrugations associated with roots 12 are the same as the normal, or full, corrugations 13.

In the embodiment illustrated, a land or flat is periodically molded along the length of the tubing to accommodate relatively large openings 20, positioned radially around the tubing, without severing wall sections 13. In another preferred embodiment, not illustrated, the flats or lands are eliminated and relatively small openings are placed in the roots 12. The illustrated embodiment is particularly suitable for egress of fluids, as in septic tank leach fields, while the last mentioned embodiment is more suitable for ingress of liquids, as for drainage of subsurface water. While the male member M is illustrated as having an opening 20, this is not necessary and occurs only because the cylindrical male member occurs at a position where otherwise a land or flat would be positioned and the hole drilling machine operates accordingly.

The corrugated tubing 10 is made of a semi-rigid polymeric material such a polyethylene or polypropylene or the equivalent.

Various modifications are contemplated and may obviously be reported to by those skilled in the art without departing from the described invention, as hereinafter defined by the appended claims, as only a preferred embodiment thereof has been disclosed.

We claim:

1. An indeterminate length of thermoplastic tubing comprised of:
   at least two corrugated sections of tubing having corrugations upon the inner and outer surfaces thereof defined by roots and crests joined by walls;
   said two sections being joined by a unitary coupling blank having a male portion integral with one section and a female portion integral with the other section; said male portion being essentially smooth walled and uncorrugated and having a plurality of radially outwardly projecting cleats thereon;
   said female portion having corrugated inner and outer surfaces with the crests thereof being essentially of the same outer diameter as the crests of said at least two corrugated sections of tubing;
   the roots of the corrugations of the female portion defining an inner diameter which is greater than the outer diameter of the said male portion and also greater than the inner diameter of the said at least two sections;
   said radially projecting cleats defining a diameter greater than the inner diameter and less than the outer diameter of the corrugations of the female portion; whereby upon severing the male and female portions,
   the female portion will telescopically receive the male portion and the cleats will lockingly engage the corrugations thereof to thereby connect said at least two corrugated sections.

2. The tubing of claim 1 wherein the cleats include an inclined camming surface and a locking surface disposed at a greater angle with respect to the wall of the male member than the angle of the inclined surface.

3. The tubing of claim 2 wherein said locking surface is disposed from the corrugations of the tubing a distance essentially equal to a multiple of the corrugation pitch.

4. The tubing of claim 1 wherein the inner diameter of the male member is no less than the inner diameter of said at least two sections as defined by the roots thereof.

5. The tubing of claim 1 wherein said tubing is perforated to thereby permit ingress and egress of liquids.

6. A connection between two sections of corrugated thermoplastic tubing having root portions and crest portions joined by wall portions comprising:
   a male member integrally molded to one of said sections and a female member integrally molded to the other of said sections;
   said male member comprising an essentially smooth walled cylindrical portion with radially outwardly projecting cleats thereon;
   said female member comprising shallow corrugated inner and outer surfaces of the same corrugation pitch as the pitch of said sections and the same outer diameter;
   the depth of the shallow corrugations of said female member being less than the depth of the corrugations of said sections to provide an inner diameter greater than the outer diameter of said male member and less than the diameter defined by the cleats on the male member;

said female member telescopically receiving said male member with the cleats being disposed between walls of said corrugations on said female member.

7. The connection of claim 6 wherein the inner diameter of the male member is no less than the inner diameter of the sections as defined by the roots thereof.

8. A thermoplastic tubing having corrugations along the length thereof, said corrugations having crests and roots connected by wall portions, said tubing having a plurality of longitudinally spaced cylindrical portions separated by said corrugations, each of said cylindrical portions having a plurality of circumferentially outwardly extending spaced projections, said tubing having a plurality of openings therethrough, the outside diameter of said cylindrical portions being less than the inside diameter of said roots of said corrugations, and the radial dimension of the outermost portions of said projections from the longitudinal center line of said tubing being greater than the radial dimension from the inside portion of said roots to the longitudinal center line of said tubing.

* * * * *